US012649396B2

(12) United States Patent
Bhandari

(10) Patent No.: US 12,649,396 B2
(45) Date of Patent: Jun. 9, 2026

(54) VENTILATION OF SEATING SURFACES IN A FLEXIBLE HEAT EXCHANGER SYSTEM

(71) Applicant: PADMINI VNA MECHATRONICS LTD., Gurgaon (IN)

(72) Inventor: Kabir Bhandari, Gurgaon (IN)

(73) Assignee: PADMINI VNA MECHATRONICS LTD., Gurgaon (IN)

( * ) Notice: Subject to any disclaimer, the term of this patent is extended or adjusted under 35 U.S.C. 154(b) by 403 days.

(21) Appl. No.: 17/601,237

(22) PCT Filed: Apr. 2, 2020

(86) PCT No.: PCT/IB2020/053155
§ 371 (c)(1),
(2) Date: Oct. 4, 2021

(87) PCT Pub. No.: WO2020/202069
PCT Pub. Date: Oct. 8, 2020

(65) Prior Publication Data
US 2022/0169156 A1 Jun. 2, 2022

(30) Foreign Application Priority Data
Apr. 2, 2019 (IN) .............................. 201911013102

(51) Int. Cl.
*B60N 2/56* (2006.01)
*B60N 2/70* (2006.01)

(52) U.S. Cl.
CPC .............. *B60N 2/5621* (2013.01); *B60N 2/70* (2013.01)

(58) Field of Classification Search
CPC ........ A47C 7/744; A47C 7/748; B60N 2/5621
See application file for complete search history.

(56) References Cited

U.S. PATENT DOCUMENTS

| | | | | |
|---|---|---|---|---|
| 4,313,640 A | * | 2/1982 | Trotman ................ | A47C 7/742 |
| | | | | 297/452.45 |
| 6,857,697 B2 | * | 2/2005 | Brennan .............. | B60N 2/5635 |
| | | | | 297/180.12 |
| 9,676,310 B2 | | 6/2017 | Fitzpatrick et al. | |
| 2005/0161986 A1 | * | 7/2005 | Brennan .............. | B60N 2/5685 |
| | | | | 297/180.13 |
| 2005/0248187 A1 | * | 11/2005 | Brennan .............. | B60N 2/5657 |
| | | | | 297/180.13 |
| 2006/0175877 A1 | * | 8/2006 | Alionte ................ | B60N 2/5685 |
| | | | | 297/180.14 |

(Continued)

*Primary Examiner* — Rodney B White
(74) *Attorney, Agent, or Firm* — Sinorica International Patent & Trademark

(57) ABSTRACT

The present disclosure comprises a ventilation system in a flexible heat exchanger system of a seating assembly. It relates to a flexible layer having perforations positioned underneath the surface of the seat that enables ventilation to control temperature and humidity. The seating assembly comprises of a plurality of layers wherein the seating assembly has an upper layer upon which the occupant is in direct contact with, a middle layer having a heat exchanger system with perforated cooling pads or ventilation system for ventilation and a lower layer which is a cushioned layer having vents. The ventilation system includes but not limited to an array of holes, pores and cavities for maintaining temperature and humidity thus making the seating assembly breathable.

5 Claims, 6 Drawing Sheets

(56) References Cited

U.S. PATENT DOCUMENTS

| | | | |
|---|---|---|---|
| 2007/0035162 A1 | 2/2007 | Bier et al. | |
| 2007/0158981 A1* | 7/2007 | Almasi ................ | B60N 2/5621 |
| | | | 297/180.12 |
| 2012/0261974 A1* | 10/2012 | Yoshizawa ........... | B60N 2/5657 |
| | | | 297/452.42 |
| 2015/0314716 A1* | 11/2015 | Zimmann ............ | B60N 2/5664 |
| | | | 297/452.42 |
| 2016/0144754 A1* | 5/2016 | Bauer .................... | B60N 2/565 |
| | | | 297/452.47 |
| 2019/0135145 A1* | 5/2019 | Zhang ................. | B60N 2/5657 |
| 2019/0160986 A1* | 5/2019 | Tsai .................... | B60H 1/0025 |
| 2021/0039791 A1* | 2/2021 | Wilson ................ | B60N 2/5657 |
| 2021/0300218 A1* | 9/2021 | Greenwood ......... | B60N 2/5657 |
| 2021/0339661 A1* | 11/2021 | Pacilli ................. | B60N 2/5642 |
| 2022/0169093 A1* | 6/2022 | Bauer ................ | B60H 1/00295 |
| 2022/0332228 A1* | 10/2022 | Park .................... | B60H 3/0085 |

* cited by examiner

VENTILATION OF SEATING SURFACES IN A FLEXIBLE HEAT EXCHANGER SYSTEM

FIELD OF THE INVENTION

The present invention relates to the ventilation system in a heat exchanger system for maintaining a climate-controlled ambience for an occupant. This system is useful in a vehicle and helps in maintaining the climate in the vehicle. More particularly, the present invention relates to a flexible layer having perforations positioned underneath the surface of the seat that enables ventilation to control temperature and humidity.

BACKGROUND OF THE INVENTION

The thermal control and ventilation of seating surfaces is beneficial for energy efficiency and occupant comfort, having been applied to various commercially successful products in the past. These include seats used in automobiles, offices and medical applications. Comfort benefits include rapid heat-up and cool-down time, a more even total body temperature for the occupant, and the reduction of perspiration that typically occurs between the occupant's skin and the portion of the body that is in contact with the seating surface, such as the lower back and legs. Energy efficiency is also improved because the occupant is heated or cooled directly without having to also heat or cool the surrounding room, vehicle cabin, or the like, thereby allowing for a smaller total thermal control system and also saving considerable energy.

Heated seats typically use an electrical resistance that is placed inside the seat cushion, at a certain depth away from the seating surface in order to avoid creating uneven pressure points once the occupant is seated. This means that the heat has to transfer through foam in order to reach the occupant, which requires a high heating wire temperature to overcome the insulating properties of the foam. These elevated temperatures often times necessitate the use of flame-retardant materials inside the foam cushion. The insulating properties of cushion materials, such as foam, also cause a time delay on the order of minutes before the occupant can begin to feel the warmth coming through the seat. In cold climates when the seat has been unoccupied for hours at a time, minimizing this delay is desirable.

Many cooled seats operate on the principle of forced-convection, meaning that air is forced through openings in the seat surface by a centrifugal air blower. This is a "single pass" flow system, where the air flows through the seat, past the occupant, and then into the ambient environment. For this to be effective, the air needs to constantly be flowing past the body of the occupant. While this is effective in pre-thermal control the seat surface before it is occupied, once someone sits down in the seat, their body obstructs many of the perforations in the seat surface that are used for delivering airflow. This reduces the amount of thermal control that is delivered, especially to the most critical parts of the body, which are directly in contact with the surface of the seat, where perspiration tends to form the most, soaking through clothing and causing discomfort. The blocking of the vents inside the seat also causes an increase in back-pressure of the air delivery channels, which changes the speed of the air delivery blower impeller. This increase in RPM causes a change in pitch of the sound of the blower, which can further create a noise, vibration and harshness issue inside the cabin.

Cooled seats that operate on the principle of forced-convection also have the disadvantage of requiring relatively high air pressures to operate. The small perforations inside the seating surface, as well as the channels required do deliver the air, often necessitate the use of high-pressure centrifugal air blowers, fans or pumps. In order to deliver an air volume sufficient for thermal control the occupant, the sound of these blowers is noticeable from inside the cabin of the vehicle. This is a problem, especially for luxury vehicles where the design target is to minimize interior noise, vibration and harshness.

Cooled seats that operate on the principle of flowing liquid through the seat in a closed-loop circuit have been described in prior art, but have not been widely successful commercially. Many describe fluid tubes that are placed within the foam cushion in order to avoid creating uneven pressure points at the surface of the seat, which would cause discomfort for the occupant. However, the insulating properties of the cushioning foam either limits the amount of thermal control that can be transferred through the seat, or this approach requires extremely cold fluid temperatures in order to overcome this insulation. Others describe coolant that flows through metal surfaces that the occupant sits on directly, but this typically creates pressure points that create discomfort during long periods of occupancy. Durability concerns also exist with this approach, due to the risk of unconventional use cases, such as child standing on the seat, or someone kneeling on the seat in order to reach something in the back of the vehicle. This causes localized pressure on the surface of the seat that would not be present in normal use, and could cause a permanent deformation of the thermal control plates or tubes, creating warranty risks for the automaker.

The ventilated seats have also been provided to increase the comfort of an occupant. It is a feature that is built in seats that directs the air through the seat unto the occupant for increased ease of the customers. Ventilated seats function via several small fans in the seat cushion and backrest. The fans draw air from inside the cabin and into the seat. The air goes through plastic ducts, an air permeable fabric and distributes it evenly throughout the seat via perforations in the leather. There are vehicles that offer several fan speeds in their seat ventilation. When switched on, they begin on the highest speed and may automatically reduce the fan speed after a pre-determined time set by the manufacturer.

U.S. Pat. No. 7,152,412B2 relates to a "Personal back rest and seat thermal control and heating system". The invention discloses a fully adjustable personal back rest and seat thermal control and heating system specifically designed to provide several hours of high efficiency thermal control or heating when used by a user as either a seat cushion and back or a mattress or sleeping surface. This combination personal back rest and seat thermal control and heating system invention is capable of delivering several hours of high efficiency personal thermal control or heating without the use of caustic or toxic chemicals with virtually no risk of injury associated with its use. The main drawback of this invention is use of separate heating and thermal control system and bulky design.

DE19830797A1 discloses the front-mounted air distribution unit (2) having outlet ducts (101) for facial ventilation and ducts (102) for foot level ventilation as well as outlet ports (19) for individual ducts (4) for the seat ventilation. The seat ducts each have a distribution flap (10) inside the distribution unit to control the ratio of hot and cold air i.e. to set the level of ventilation. Each seat is connected to its duct and has a distribution network of air ducts over the seat and seat back. The individual seat ducts also serve to supply conditioned air to foot-level grilles (30) in front of the rear seat. The main drawback of this invention is that the system is complicated to design.

EP1076797B1 discloses a system for thermally conditioning and pumping a fluid having use as a ventilation system for vehicle seats and other applications. The system includes a thermoelectric heat exchanger having a thermoelectric element (46) configured to pump heat from one body to another body. A pair of heat exchanger elements (42, 44) comprising rotor units are coupled to the thermoelectric element (46) for both transferring heat to and from the thermoelectric element (46) and generating a fluid flow across the thermoelectric element (46). The conditioned fluid may be placed in thermal communication with a variety of objects, one of which is a vehicle seat to provide localized heating and cooling of a person sitting on the seat. The main drawback of this invention is that heat exchange is done through a thermoelectric element.

Energy efficiency is becoming more critical in automobiles, especially those powered by batteries where the total available driving distance is limited by the capacity of the battery. Reducing the amount of energy consumed by auxiliary loads, such as the cabin air conditioning and heating systems, is critical to achieving a longer total driving range. In extremely cold or hot climates, the heating or thermal control of the vehicle cabin can reduce total available driving range by more than 30% depending on the use case. If it is possible to comfortably cool or heat the occupant directly through the seating surface, without having to also condition the temperature of the entire vehicle cabin, significant energy savings can be realized and the vehicle's total effective driving range can be increased.

Therefore, a need exists in the field for a way to heat or cool and to provide air ventilation on a seating surface in a manner that provides even cushioning support for the body while simultaneously avoiding blockage of the thermal control passages when the occupant sits down. A further need is for this heat exchange mechanism and air ventilation mechanism is to have a short thermal pathway and good thermal contact with the occupant, so as to minimize warm-up and cool-down times and also maximize the rate of heat exchange with the occupant's body. Finally, there is a need for this system to be impervious to damage from localized pressure, such as from an occupant standing on the seating surface.

OBJECT OF THE INVENTION

The main object of the present invention is to provide a seating assembly with a flexible heat exchanger system for heating or cooling of the seat's surface.

Yet another object of the present invention is to provide a seating assembly with a ventilation system in a heat exchanger system for maintaining temperature of the seat's surface.

Yet another object of the present invention is to provide a heat exchanger system having plurality of channels for heat exchange medium to flow within the seat's surface.

Yet another object of the present invention is to provide a heat exchanger system having an array of ventilation holes or perforated cooling pads such that the 40-60% of the total area of heat exchanger system is ventilated for uniformly distribution of air on the seat's surface.

Still another object of the present invention is to facilitate a short thermal pathway and good thermal contact with the occupant so as to minimize the rate of heat exchange with the occupant's body.

SUMMARY OF THE INVENTION

In a main embodiment, the present invention provides a seating assembly with a flexible heat exchanger system having a ventilation system for thermal control of the surface of the seat. The system is designed to maintain the temperature, humidity and prevents the blockage of medium to flow due to the pressure of an occupant's weight. The seating assembly comprises of a plurality of layers wherein the seating assembly has an upper layer upon which the occupant is in direct contact with, a middle layer is a flexible heat exchanger system with perforated cooling pads or ventilation system for ventilation and a lower layer which is a cushioned layer having vents. The seating assembly is attached to a secondary heat exchanger system for circulating a heat exchange medium. The ventilation system includes but not limited to an array of holes, pores and cavities such that the 40-60% of the total area of the heat exchanger system is ventilated for maintaining temperature and humidity thus making the seating assembly breathable.

In another embodiment, the present invention provides a flexible heat-exchanger system for seating assembly having a ventilation system for thermal control of a seat. The flexible heat exchanger system comprises of a top layer, a bottom layer, a matrix of heat exchange medium channels/passages, a plurality of heat exchange medium connection tubes positioned below the seating surface of the seating assembly, a ventilation system formed as top and bottom layer of the flexible heat exchanger system are heat sealed and a heat exchange medium to circulate in the channels of the heat exchanger system. At least one cushioning layer of the seating assembly is placed underneath the flexible heat exchanger system and at least one secondary heat exchanger system with thermal control module for heating or cooling of the heat exchange medium is connected to the flexible heat exchanger system. The heat exchange medium includes but not limited to fluid, gas or any other commonly used heat exchange medium and the ventilation system includes but not limited to an array of holes, pores and cavities such that 40-60% of the total area of heat exchanger system is ventilated for providing and distributing air uniformly for breathing within the seating assembly.

BRIEF DESCRIPTION OF THE DRAWING

Some embodiments of the present invention are illustrated as an example and are not limited by the figures of the accompanying drawings, in which like references may indicate similar elements and in which.

DESCRIPTION OF THE INVENTION

The present invention will now be described more fully hereinafter with reference to the accompanying drawings in which a preferred embodiment of the invention is shown. This invention may, however, be embodied in many different forms and should not be construed as being limited to the embodiment set forth herein. Rather, the embodiment is provided so that this disclosure will be thorough, and will fully convey the scope of the invention to those skilled in the art. Like numbers refer to like elements throughout.

The seat heat-exchange devices, ventilation system and methods are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 1:
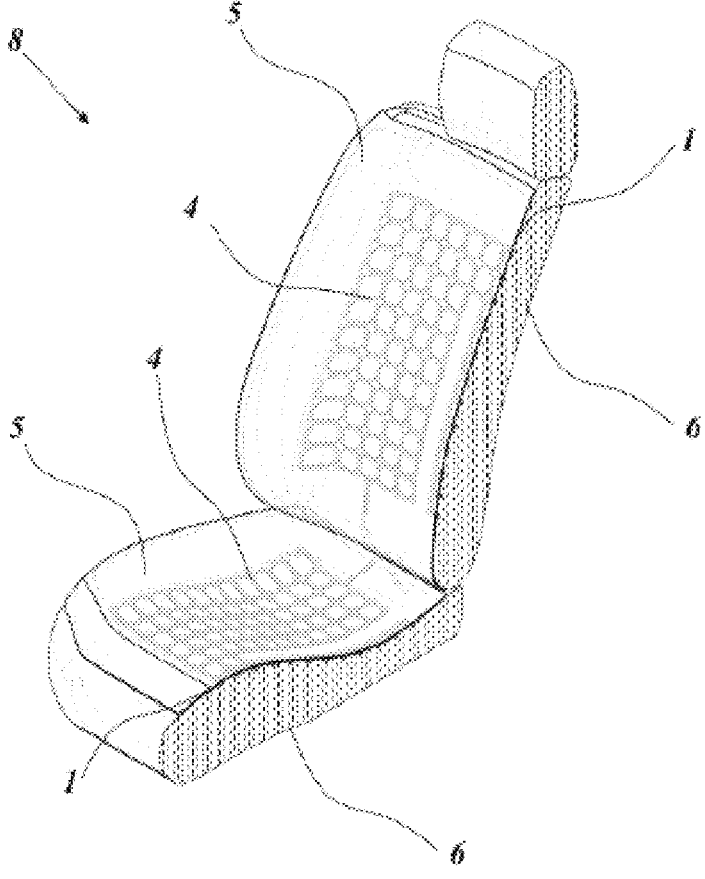
FIG. 1 illustrates a transparent cut-away perspective view of one example of a thermally controlled seating assembly according to various embodiments of the present invention.

The present invention will now be described by referencing the appended figures representing preferred embodiments. FIG. 1 depicts a side cut-away view of one example of a thermally controlled seating assembly 8, featuring the flexible heat-exchanger system 1 positioned below the seating surface 5 and a ventilation system with ventilation holes 10 positioned on the heat exchanger system 1. The seating surface is made from single pieces of cloth, leather, vinyl, or any commonly available upholstery material, or any combination of the foregoing. The seating surface 5 covers the upper and the lower portion of the seat. Either portion of the seat may be covered continuously or non-continuously with the seating surface 5.

Figure 3A:
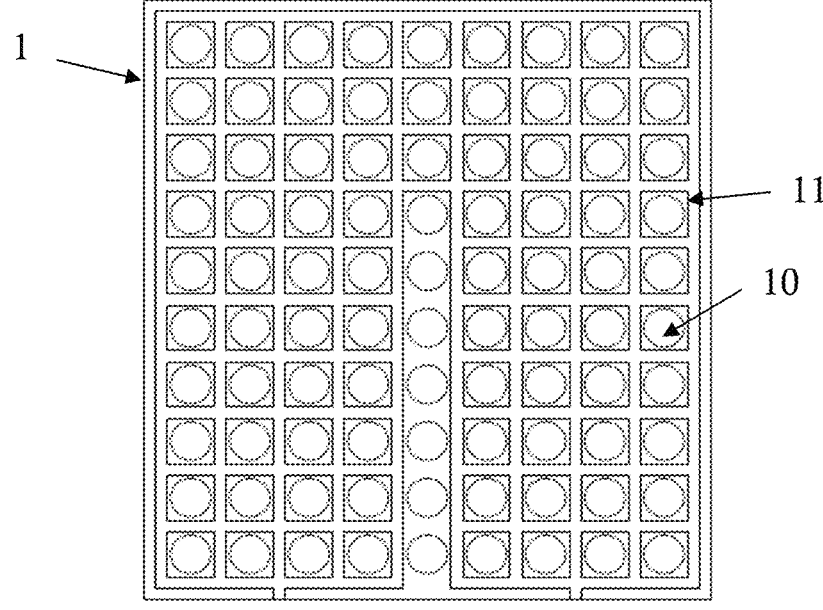
FIG. 3(a)-3(b) illustrates a top view and a perspective view of heat exchanger system with a ventilation system having single hole pattern respectively according to various embodiments of the present invention.
Figure 3B:
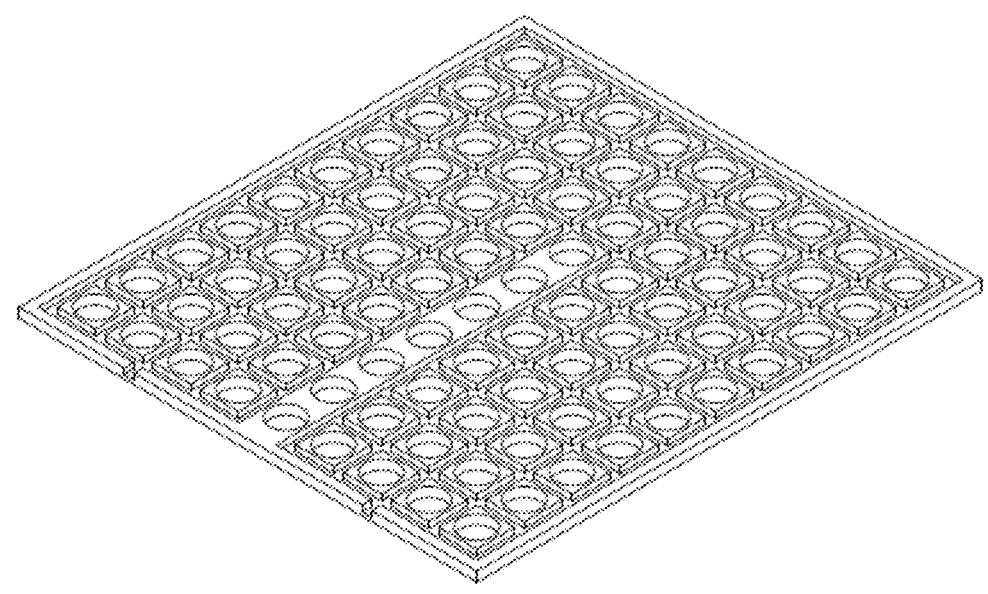

The flexible heat exchanger system 1 comprised of a matrix of interconnected channels 4. While one pattern of the matrix is depicted in FIG. 3(a)-3(b), other embodiments may be permissible. In a preferred embodiment for the assemblies, the matrix is comprised of interconnected channels 4 in a series of rows and columns. Each row is communicated with each column through a heat exchange medium. Further, each row is communicated with one another through a heat exchange medium, and each column is in communication with one another through a heat exchange medium. The rows extend across the width of the top and bottom layer while the column extends the length of the top and bottom layer of the flexible heat exchanger system. The rows are transverse to the columns. The medium includes but not limited to water, water/glycol, brine, or air any other commonly used heat exchange medium.

In a preferred embodiment for the ventilation system of the heat exchanger system, the ventilation system comprises of an array of ventilation blocks with each block having a plurality of ventilation holes in a series of rows and columns such that the ventilation holes 10 occupy 40-60% of the total area of the heat exchanger system 1 is ventilated. The size of ventilation system is customizable as per size of seating assembly. Each array of row and column has ventilated pores, holes and cavities which are independent of each other but having same functionality. The purpose of ventilation system is, but not limited to, make the seating assembly breathable, to increase the comfort of an occupant, to dry the moisture between the seating assembly and body of an occupant, to reduce the temperature of the seating assembly.

FIG. 1 also reveals the cushioning layer 6 that is underneath the heat exchanger system 1 which is in direct contact with the seating surface 5. The cushioning layer is made of a material including but not limited to polyurethane foam, biodegradable foams, down, and other commonly used furniture materials. While certain materials for the cushioning material have been disclosed, the method and apparatus described herein are not limited to these materials.

Figure 2:
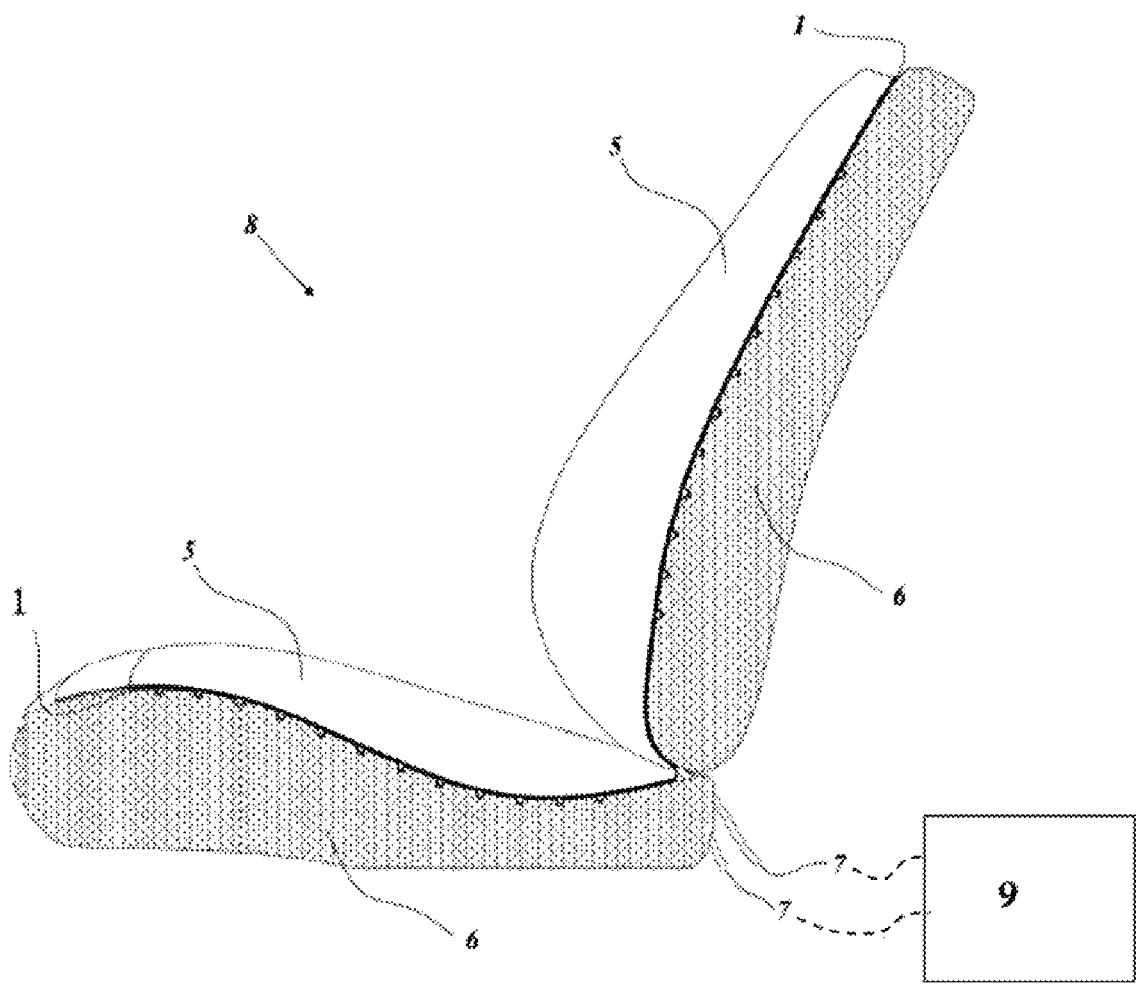
FIG. 2 illustrates a side cut-away view of one example of a thermally controlled seating assembly according to various embodiments of the present invention.

Referring to FIG. 2, a side-cut-away-view of the thermally controlled seating assembly 8. The flexible heat exchanger 1 is in connection with a plurality of heat exchange medium connection tubes 7 which deliver and remove the closed-loop heat exchange medium and flows through the seat heat exchanger system 1, which is placed below the seating surface 5 on the cushion and backrest portions of the seat.

Referring to FIGS. 3(a) and 3(b), is a view of the heat exchanger system 1 having a ventilation system comprising of an array of ventilation blocks 11 with each block having a plurality of ventilation holes in a series of rows and columns such that the ventilation holes 10 occupy 40-60% of the total area of the heat exchanger system 1 with ventilation holes 10. The ventilation system is shown by adding an array of holes or pores or cavities in the heat exchanger system. The holes may vary in size, shape and pattern depending on the design and requirement. The ventilation holes add more flexibility to the heat exchanger system, produces a substantially uniform air flow in all the areas of seating assembly, causes air movement laterally, longitudinally and vertically through the seating assembly.

Figure 4A:
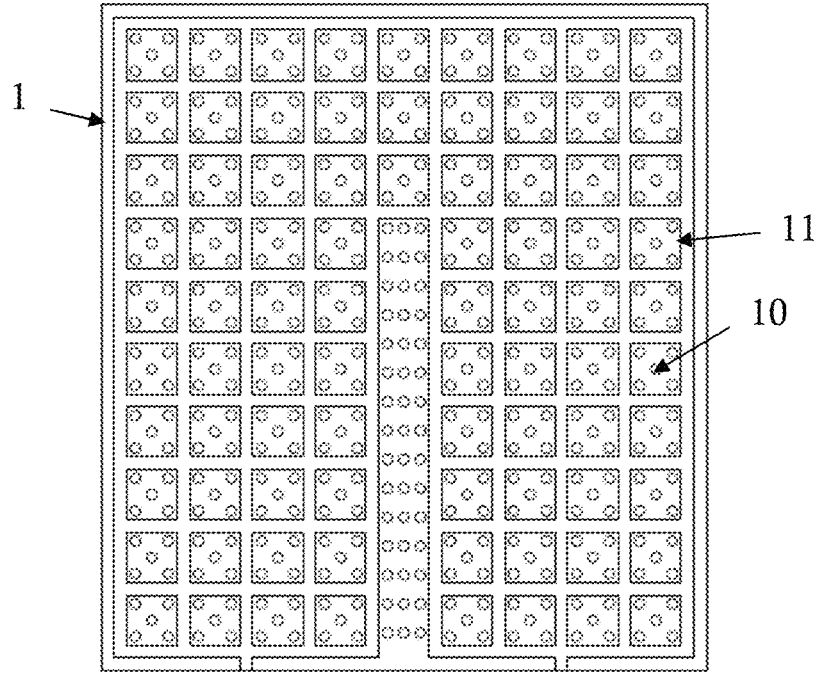
FIG. 4(a)-4(b) illustrates a top view and a perspective view of heat exchanger system with a ventilation system having five hole pattern respectively according to various embodiments of the present invention.
Figure 4B:
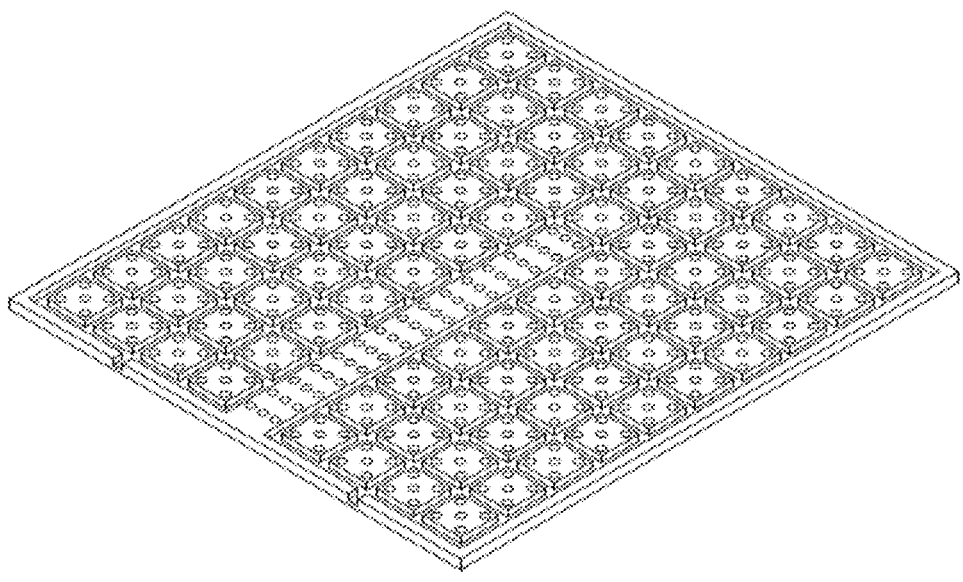
Figure 5A:
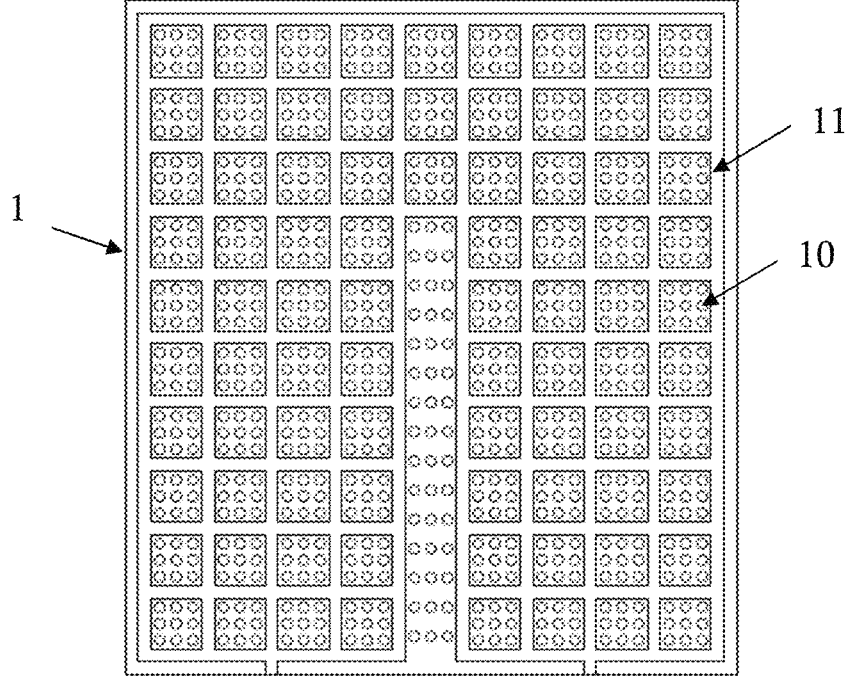
FIG. 5(a)-5(b) illustrates a top view and a perspective view of heat exchanger system with a ventilation system having nine hole pattern respectively according to various embodiments of the present invention.
Figure 5B:
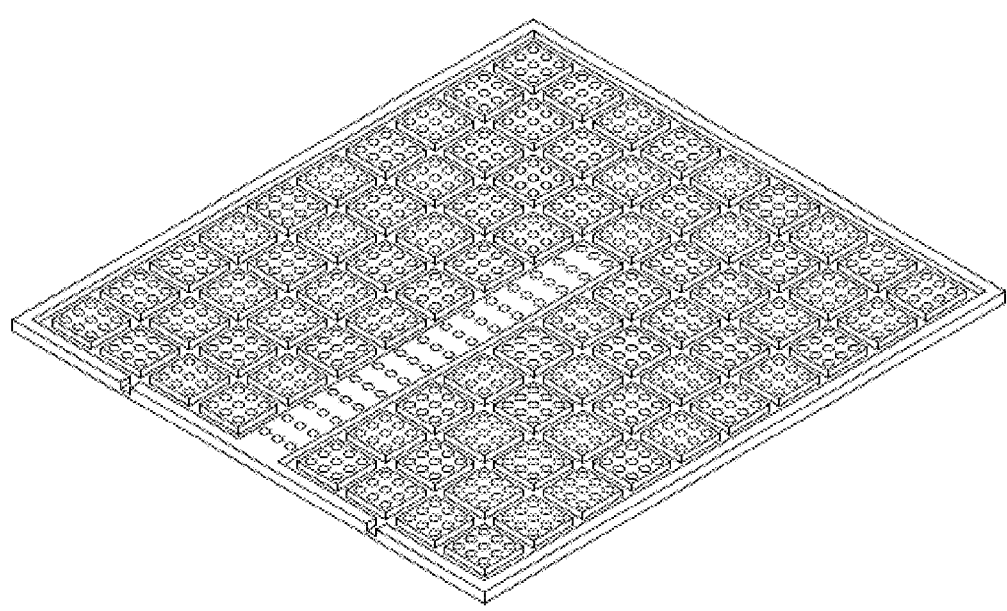
Figure 6A:
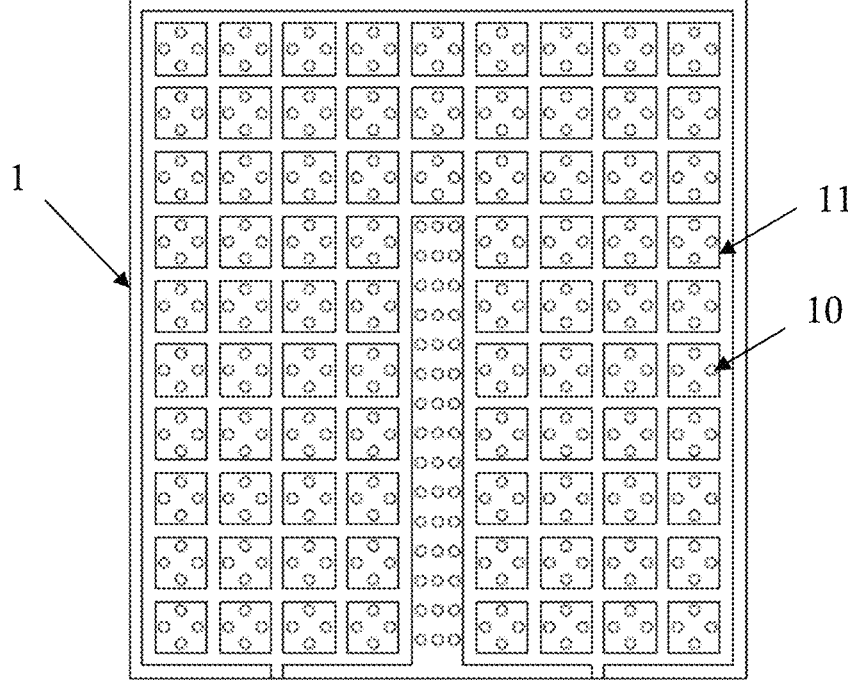
FIG. 6(a)-6(b) illustrates a top view and a perspective view of heat exchanger system with a ventilation system having four hole pattern respectively according to various embodiments of the present invention.
Figure 6B:
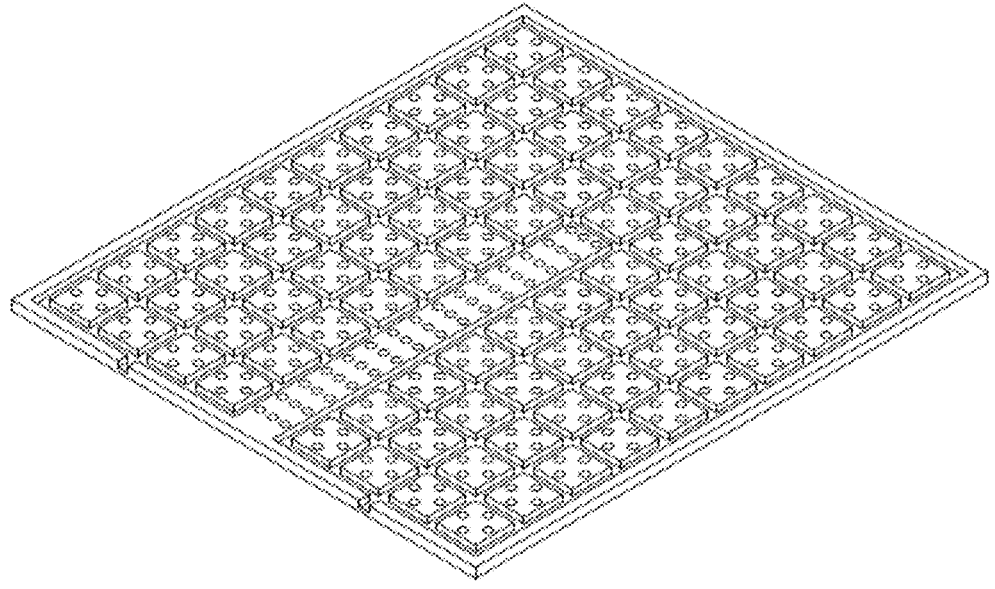

While FIG. 3(a)-3(b) show a pattern having a single hole in the ventilation block 11, FIG. 4(a)-4(b) show a five hole pattern in each ventilation block 11, FIG. 5(a)-5(b) show nine hole pattern in each ventilation block 11 and FIG. 6(a)-6(b) show four hole pattern in each ventilation block 11. Although, the ventilation holes 10 shown are circular, the shape of holes is any shape including but not limited to circle, oval, square, trapezoidal, triangular and alike. The number of ventilation holes 10 on the system 1 are customizable and dependent on the total area of the heat exchanger system 1 and size of each ventilation hole.

The preferred embodiment of the invention having heat exchanger system 1 with a top layer and a bottom layer made from PVC material that is between 0.1 and 1.0 mm thick, which are heat-sealed to one another, creating heat exchange medium passages 4 that have a cross-sectional area of between 1 mm$^2$ to 75 mm$^2$. The ventilation system is by the way of holes, pores and cavities such that the 40-60% of the total heat exchanger system is ventilated.

Therefore, the present invention provides a heat exchange mechanism and a uniform ventilation mechanism to have a short thermal pathway, uniform air distribution and good thermal contact with the occupant, so as to minimize warm-up and cool-down times and also maximize the rate of heat exchange with the occupant's body.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

I claim:

1. A seating assembly comprising:
a seat portion including:
    an upper layer forming a seating surface;
    a middle layer including a flexible heat-exchanger system, the flexible heat-exchanger system comprising a single flexible sheet having:
        a top layer and a bottom layer joined to one another by heat-sealing to define a plurality of heat-exchange medium channels arranged in a plurality of rows extending across a width of the single flexible sheet and a plurality of columns extending across a length of the single flexible sheet;
        the plurality of heat-exchange medium channels in all of the plurality of rows being in fluid communication with one another and the plurality of heat-exchange medium channels in all of the plurality of columns being in fluid communication with one another, and all of the plurality of rows being in fluid communication with all of the plurality of columns;
        each of the plurality of rows intersecting each of the plurality of columns to define a plurality of enclosed areas of the single flexible sheet; and
        a plurality of ventilation blocks, each ventilation block being located within a respective one of the plurality of enclosed areas, each ventilation block comprising a sheet portion of the single flexible sheet and at least one ventilation hole extending through the flexible sheet; and
    a lower layer beneath the flexible heat-exchanger system, the lower layer comprising a cushioning layer having a plurality of vents; and
a seat back portion extending upwardly from the seat portion;
a plurality of heat-exchange medium connection tubes connected to the plurality of heat-exchange medium channels; and a secondary heat-exchange system connected to the plurality of heat-exchange medium connection tubes.

2. The seating assembly of claim 1, wherein a pair of adjacent ventilation blocks are separated by a gap corresponding to a region defined by the plurality of heat-exchange medium channels.

3. The seating assembly of claim 2, wherein each ventilation block includes one ventilation hole.

4. The seating assembly of claim 2, wherein the seat back portion includes:
an upper layer forming a seating surface;
a middle layer including a flexible heat-exchanger system, the flexible heat-exchanger system comprising a single flexible sheet having:
    a top layer and a bottom layer joined to one another by heat-sealing to define a plurality of heat-exchange medium channels arranged in a plurality of rows extending across a width of the single flexible sheet and a plurality of columns extending across a length of the single flexible sheet;
    the plurality of heat-exchange medium channels in all of the plurality of rows being in fluid communication with one another and the plurality of heat-exchange medium channels in all of the plurality of columns being in fluid communication with one another, and all of the plurality of rows being in fluid communication with all of the plurality of columns;
    each of the plurality of rows intersecting each of the plurality of columns to define a plurality of enclosed areas of the single flexible sheet; and
    a plurality of ventilation blocks, each ventilation block being located within a respective one of the plurality of enclosed areas, each ventilation block comprising a sheet portion of the single flexible sheet and at least one ventilation hole extending through the flexible sheet; and
a lower layer beneath the flexible heat-exchanger system, the lower layer comprising a cushioning layer having a plurality of vents.

5. The seating assembly of claim 4, wherein the seat portion and the seat back portion are integrated as a continuous seating structure covered by a common seating surface.

* * * * *